United States Patent
Bian

(10) Patent No.: US 11,841,533 B2
(45) Date of Patent: Dec. 12, 2023

(54) PHOTONIC INTEGRATED CIRCUIT STRUCTURE WITH COUPLER FOR INTERLAYER WAVEGUIDE COUPLING

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/709,841

(22) Filed: Mar. 31, 2022

(65) Prior Publication Data

US 2023/0314706 A1  Oct. 5, 2023

(51) Int. Cl.
  *G02B 6/12* (2006.01)
  *G02B 6/125* (2006.01)

(52) U.S. Cl.
  CPC ......... *G02B 6/12016* (2013.01); *G02B 6/125* (2013.01); *G02B 2006/12147* (2013.01)

(58) Field of Classification Search
  None
  See application file for complete search history.

(56) References Cited

U.S. PATENT DOCUMENTS

| | | | |
|---|---|---|---|
| 5,232,866 A | 8/1993 | Beyer et al. | |
| 8,722,508 B2 | 5/2014 | Botula et al. | |
| 9,219,068 B2 | 12/2015 | Cheng et al. | |
| 10,429,582 B1 | 10/2019 | Bian et al. | |
| 10,649,140 B1 | 5/2020 | Bian et al. | |
| 10,746,921 B2 | 8/2020 | Bian et al. | |
| 10,795,188 B2 | 10/2020 | Aflatouni et al. | |
| 10,816,726 B1 | 10/2020 | Peng et al. | |
| 10,989,876 B1 | 4/2021 | Peng et al. | |
| 2005/0047708 A1* | 3/2005 | Ma ..................... | G02B 6/12002 385/14 |

(Continued)

OTHER PUBLICATIONS

Grineviciute et al., "Impact of Deposition Conditions on Nanostructured Anisotropic Silica Thin Films in Multilayer Interference Coatings," Applied Surface Science, 562, 2021, pp. 1-8.

(Continued)

*Primary Examiner* — Chad H Smith
(74) *Attorney, Agent, or Firm* — Anthony Canale; Hoffman Warnick LLC

(57) ABSTRACT

Disclosed is a structure including a first waveguide core with a first end portion and a second waveguide core with a second end portion, which overlays and is physically separated from the first end portion. The structure includes a coupler configured for interlayer waveguide coupling. Specifically, the coupler includes an additional waveguide core stacked vertically between and physically separated from the first end portion and the second end portion. Optionally, the coupler includes multiple additional waveguide cores. The shapes of the various waveguide cores are configured in order to achieve mode matching so that optical signals pass between the first end portion of the first waveguide core and the second end portion of the second waveguide core through each additional waveguide core in sequence. Also disclosed is a structure including a crossing array implemented using couplers.

20 Claims, 10 Drawing Sheets

(56) References Cited

U.S. PATENT DOCUMENTS

| | | | |
|---|---|---|---|
| 2012/0288229 A1 | 11/2012 | Doerr et al. | |
| 2015/0247974 A1* | 9/2015 | Painchaud | G02B 6/12004 385/28 |
| 2016/0266321 A1* | 9/2016 | Tummidi | G02B 6/107 |
| 2017/0212304 A1* | 7/2017 | Sacher | G02B 6/12002 |
| 2020/0012045 A1 | 1/2020 | Bian et al. | |

OTHER PUBLICATIONS

Schubert, Martin F. et al., "Distributed Bragg Reflector Consisting of High-and Low-Refractive-Index Thin Film Layers Made of the Same Material," Applied Physics Letters, 90, 141115, 2007, pp. 1-3.

Pawlak, Dorota A., "Metamaterials and Photonic Crystals—Potential Applications for Self-Organized Eutectic Micro- and Nanostructures," Scientia Plena, vol. 4, No. 1, 2008, pp. 1-11.

Aboketaf et al., "Towards Fully Automated Testing and Characterization for Photonic Compact Modeling on 300-MM Wafer Platform," OSA 2021, pp. 1-3.

Bian et al., "3D Silicon Photonic Interconnects and Integrated Circuits Based on Phase Matching," IEEE 71st Electronic Components and Technology Conference (ECTC), 2021, pp. 2279-2284.

Bian et al., "Hybrid III-V laser integration on a Monolithic Silicon Photonic Platform," Optical Fiber Communication Conference (OFC) 2021, OSA Technical Digest (Optical Publishing Group 2021), paper M5A.2.

Bian et al., "Light Manipulation in a Monolithic Silicon Photonics Platform Leveraging 3D Coupling and Decoupling," Frontiers in Optics/Laser Science, OSA 2020, pp. 1-2.

Bian et al., "Monolithically Integrated Silicon Nitride Platform," OSA 2021, pp. 1-3.

Bian et al., "Towards Low-Loss Monolithic Silicon and Nitride Photonic Building Blocks in State-of-the-Art 300mm CMOS Foundry," Frontiers in Optics/Laser Science, OSA 2020, pp. 1-2.

Cai et al., "Analysis of the Coupling Characteristics of a Tapered Three-Guide Coupled System," Journal of Lightwave Technology, vol. 8, No. 10, 1990, pp. 1621-1629.

Giewont et al., "300-mm Monolithic Silicon Photonics Foundry Technology," IEEE Journal of Selected Topics in Quantum Electronics, vol. 25, No. 5, 2019, pp. 1-12.

IMEC, "IMEC's Si Photonics Platform: Prototyping Services On 200MM and 300 MM Wafers," https://www.imec-int.com/drupal/sites/defaul/files/2019-03/SILICON-PHOTONICS-V06, Accessed on Mar. 31, 2022, pp. 1-4.

Maegami et al., "Completely CMOS compatible SiN-Waveguide-Based Fiber Coupling Structure for Si Wire Waveguides," Optics Express 16856, vol. 24, No. 15, 2016, pp. 1-10.

Mu et al., "Edge Couplers in Silicon Photonic Integrated Circuits: A Review," Applied Sciences, 2020, 10, 1538, pp. 1-29.

Peng et al., "A CMOS Compatible Monolithic Fiber Attach Solution with Reliable Performance and Self-Alignment," Optical Fiber Communication Conference (OFC) 2020, OSA Technical Digest (Optical Society of America, 2020).

Rakowski et al., "45nm CMOS—Silicon Photonics Monolithic Technology (45CLO) for Next-Generation, Low Power and High Speed Optical Interconnects," OSA 2020, pp. 1-3.

Sacher et al., "Monolithically Integrated Multilayer Silicon Nitride On-Silicon Waveguide Platforms for 3-D Photonic Circuits and Devices," Proceedings of the IEEE, vol. 106, No. 12, 2018, pp. 2232-2245.

Sakai et al., "Low-Loss Ultra-Small Branches in a Silicon Photonics Wire Waveguide," IEICE Trans. Electron, vol. E85-C, No. 4, 2002, pp. 1033-1038.

Shang et al., "Low-Loss Compact Multilayer Silicon Nitride Platform for 3D Photonic Integrated Circuits," OSA 2015, pp. 1-9.

Sodagar et al., "High-Efficiency and Wideband Interlayer Grating Couplers in Multilayer Si/SiO2/SiN Platform for 3D Integration of Optical Functionalities," OSA 2014, pp. 1-11.

Zhu et al., "Very High Efficiency Optical Coupler for Silicon Nanophotonic Waveguide and Single Mode Optical Fiber," Optics Express 18462, vol. 25, No. 15, 2017, pp. 1-12.

U.S. Appl. No. 17/723,608, filed Apr. 19, 2022, Bian et al., GlobalFoundries U.S. Inc., 52 pages.

* cited by examiner

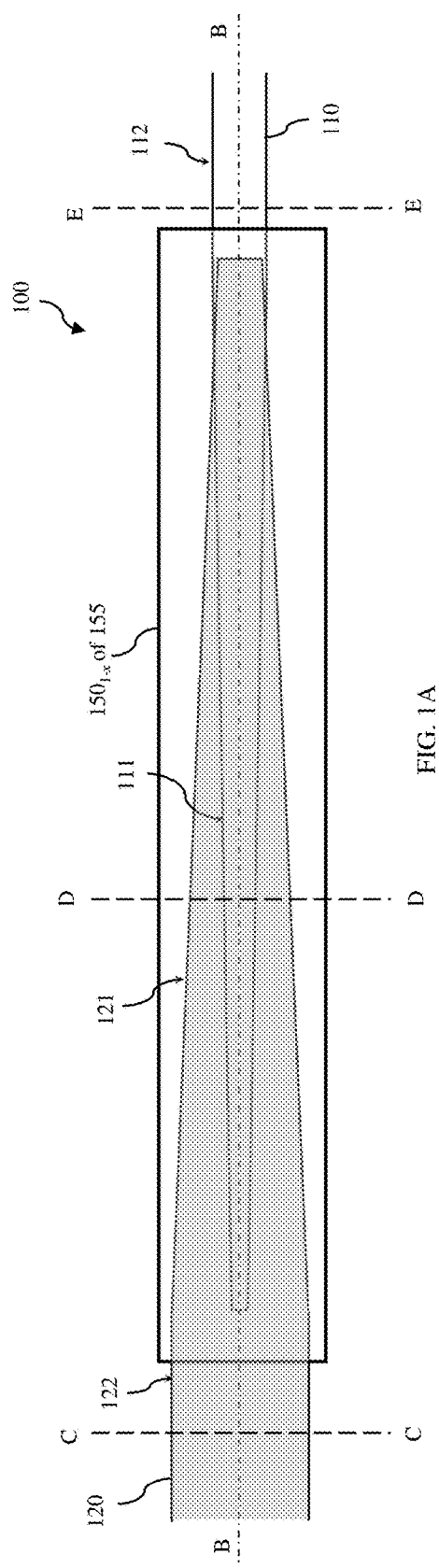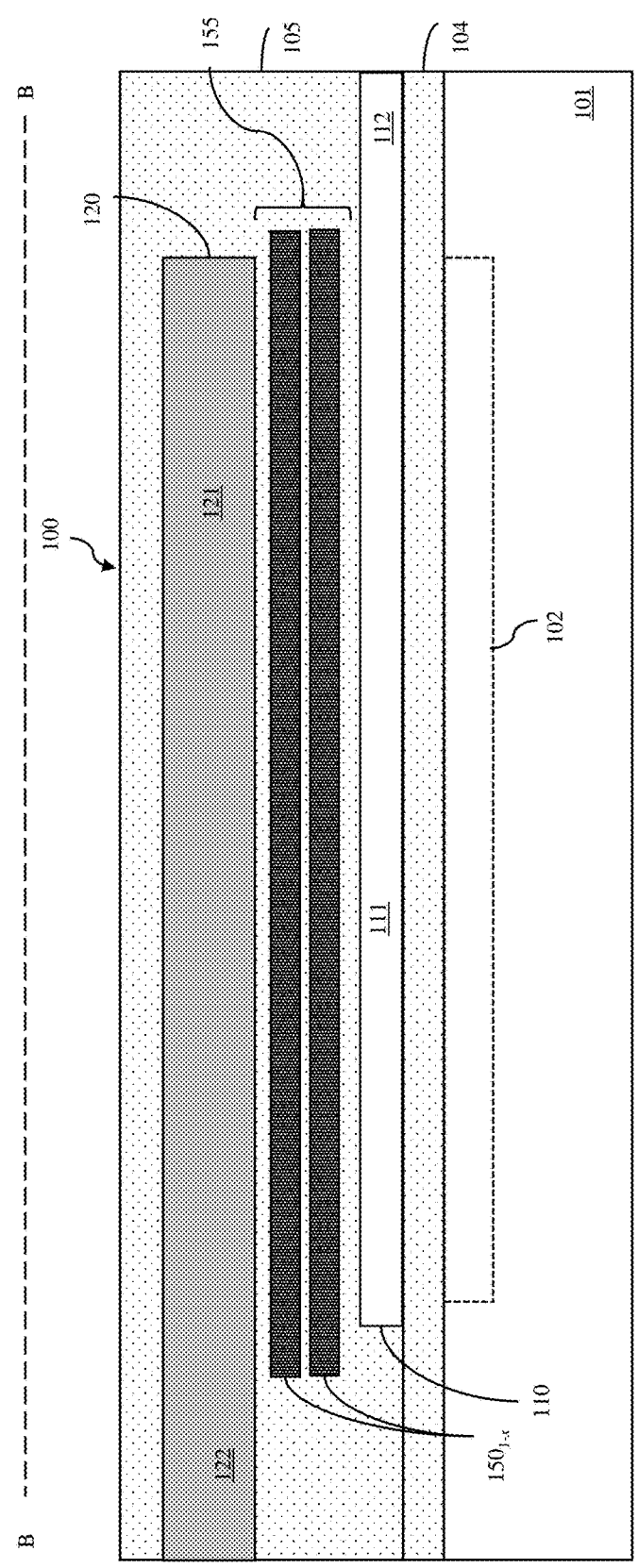
FIG. 1A
FIG. 1B

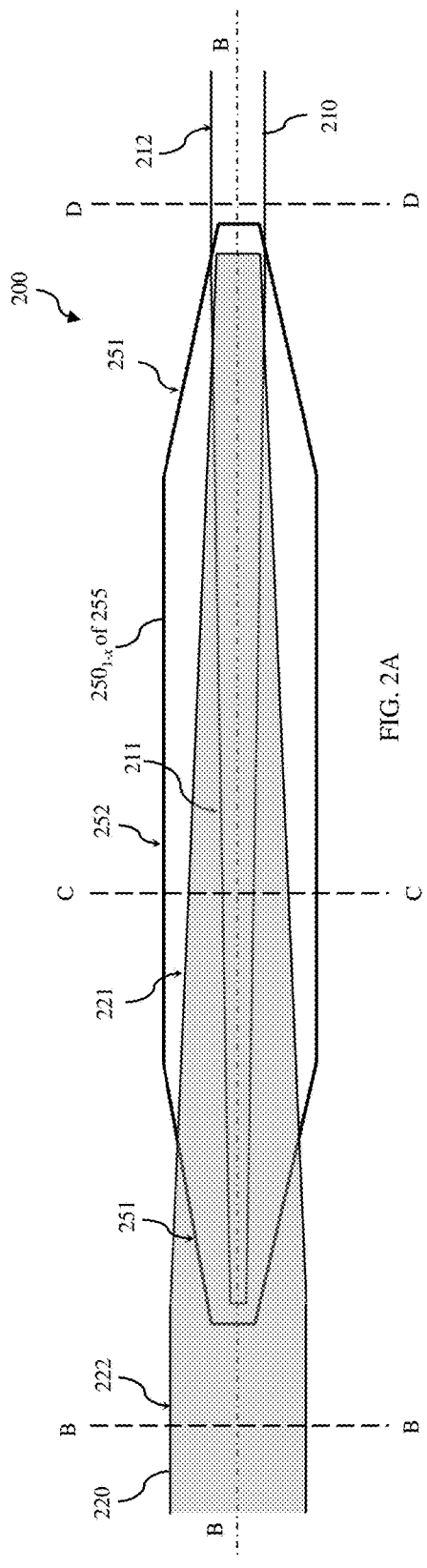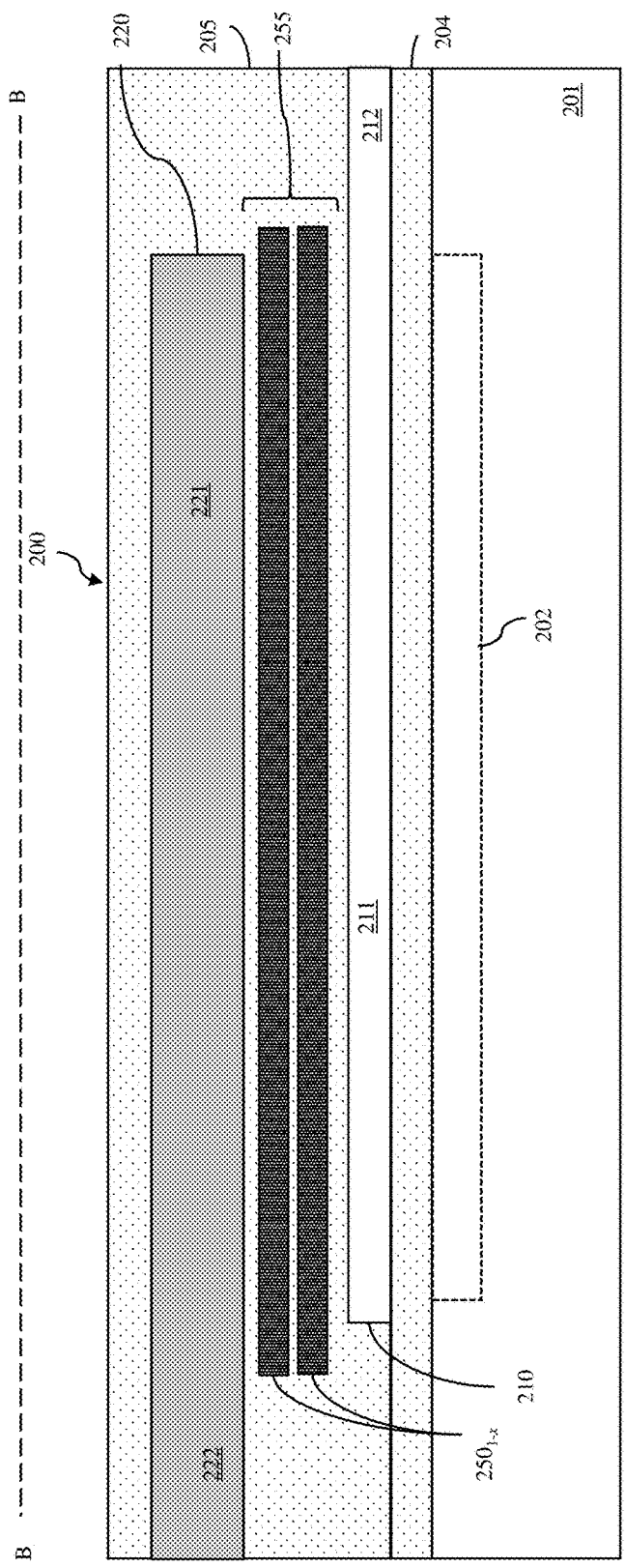
FIG. 2A
FIG. 2B

PHOTONIC INTEGRATED CIRCUIT STRUCTURE WITH COUPLER FOR INTERLAYER WAVEGUIDE COUPLING

BACKGROUND

FIELD OF THE INVENTION

The present invention relates to photonic integrated circuit (PIC) structures and, more particularly, to embodiments of a PIC structure including a coupler for interlayer waveguide coupling.

DESCRIPTION OF RELATED ART

In photonic integrated circuit (PIC) structures, two waveguides can be coupled so that optical signals can pass between them. For example, two waveguide cores can be in different layers of a PIC structure and each surrounded by cladding. An end portion of one of the waveguide cores can extend laterally over an end portion of the other waveguide core. These adjacent end portions of the two waveguide cores can be physically separated by the cladding. However, they must be sufficiently close so that optical signals can pass between them and, particularly, so that optical signals can pass around a location, along the adjacent end portions, where mode matching occurs (i.e., where the propagation constant of optical mode inside the two waveguides becomes the same). Unfortunately, in some applications, other design considerations can make it difficult to limit the separation distance between the adjacent end portions of the two waveguides without exceeding some predetermined optimal maximum threshold amount of signal loss.

SUMMARY

Embodiments of a structure disclosed herein can include a first waveguide core with a first end portion. The structure can further include a second waveguide core with a second end portion that overlays the first end portion. The structure can further include a coupler between the first end portion and the second end portion. The coupler can include an additional waveguide core that is stacked vertically between and physically separated from the first end portion and the second end portion.

Embodiments of a structure disclosed herein can include a semiconductor substrate, which has a first surface, a second surface opposite the first surface, and a cavity adjacent to the second surface. The structure can further include an insulator layer on the second surface of the semiconductor substrate and extending laterally over the cavity. The structure can further include a first waveguide core, which is on the insulator layer and which has a first end portion aligned above the cavity. The structure can further include a second waveguide core, which has a second end portion that overlays and is physically separated from the first end portion. The structure can further include a coupler between the first end portion and the second end portion, wherein the coupler comprises an additional waveguide core stacked vertically between and physically separated from the first end portion and the second end portion. In these embodiments, leakage loss is minimized due to additional isolation provided by the cavity in the substrate.

Embodiments of a structure disclosed herein can include a group of first waveguide cores. In this group, the first waveguide cores can have first end portions, respectively. The structure can further include a group of second waveguide cores. In this group, the second waveguide cores can be parallel and can have second end portions overlaying and physically separated from the first end portions, respectively. The structure can further include a group of third waveguide cores. The group of second waveguide cores can overlay the group of third waveguide cores with the third waveguide cores being oriented essentially perpendicular to the second waveguide cores (e.g., in a crossing array arrangement). The structure can further include a group of couplers. Each coupler can include at least one additional waveguide core stacked vertically between and physically separated from a first end portion of a first waveguide core and a second end portion of a second waveguide core.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 1A is a layout diagram and FIGS. 1B-1E are different cross-section diagrams illustrating an embodiment of a PIC structure including a coupler for interlayer waveguide coupling;

FIG. 2A is a layout diagram and FIGS. 2B-2E are different cross-section diagrams illustrating another embodiment of a PIC structure including a coupler for interlayer waveguide coupling;

DETAILED DESCRIPTION

As mentioned above, in PIC structures, two waveguides can be coupled so that optical signals can pass between them. For example, two waveguide cores can be in different layers of a PIC structure and surrounded by cladding. An end portion of one of the waveguide cores can extend laterally over an end portion of the other waveguide core. These adjacent end portions of the two waveguide cores can be physically separated by the cladding. However, they must be sufficiently close so that optical signals can pass between them and, particularly, so that optical signals can pass around a location, along the adjacent end portions, where mode matching occurs (i.e., where the propagation constant of optical mode inside the two waveguides becomes the same). Unfortunately, in some applications, other design considerations can make it difficult to limit the separation distance between the adjacent end portions of the two waveguides without exceeding some optimal maximum threshold amount for signal loss.

In view of the foregoing, disclosed herein are embodiments of a PIC structure including waveguides in different layers and a coupler configured for interlayer waveguide coupling. The coupler can, for example, facilitate low-loss optical signal transmission between the waveguides when the separation distance between adjacent overlapping end portions of the waveguide cores is too great to allow optical signals to pass therebetween without exceeding some optimal maximum threshold amount of signal loss. More specifically, the structure can include a first waveguide core with a first end portion and a second waveguide core with a second end portion, which overlays and is physically separated from the first end portion. The structure can further include a coupler between the first end portion and the second end portion. The coupler can include an additional waveguide core (also referred to herein as a mini-waveguide core) stacked vertically between and physically separated from the first end portion and the second end portion. Optionally, the coupler can include multiple additional waveguide cores. The shapes of the various waveguide cores can be configured to achieve mode matching so that optical signals pass between the first end portion of the first waveguide core and the second end portion of the second waveguide core through each additional waveguide core in sequence (e.g., to avoid exceeding the predetermined optimal maximum threshold amount of signal loss). Optionally, the PIC structure can further include an in-substrate cavity aligned below the end portions of the waveguide cores and the coupler therebetween in order to minimize leakage loss. Also disclosed herein are embodiments of a PIC structures including an on-chip system (e.g., a photonic computing system) with a crossing array implemented using couplers configured for interlayer waveguide coupling.

Figure 1E:
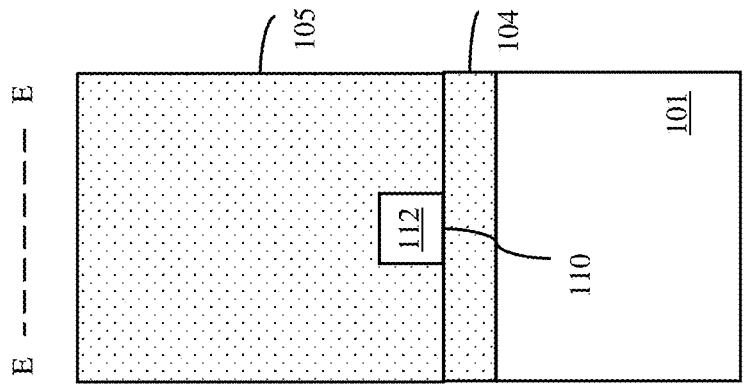
Figure 1D:
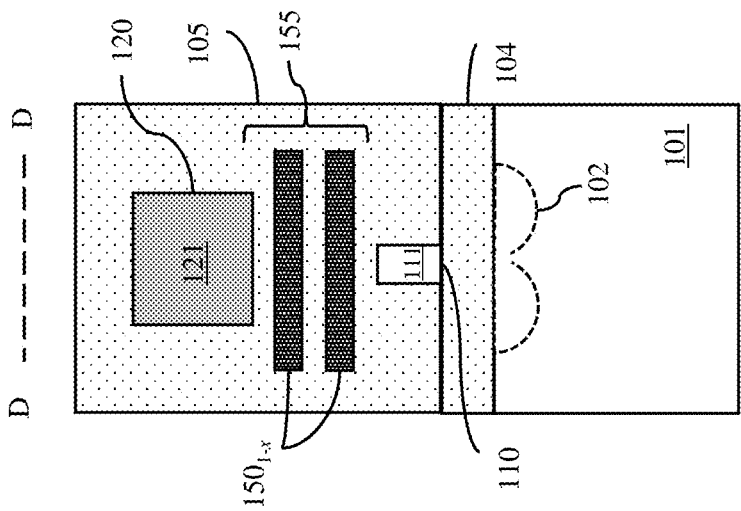
Figure 1C:
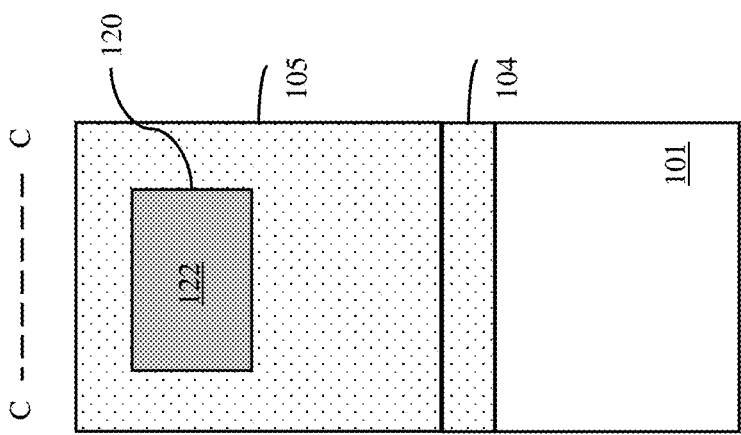
Figure 2E:
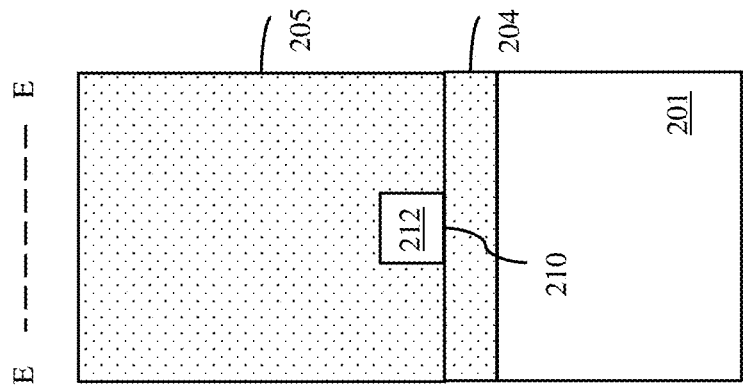
Figure 2D:
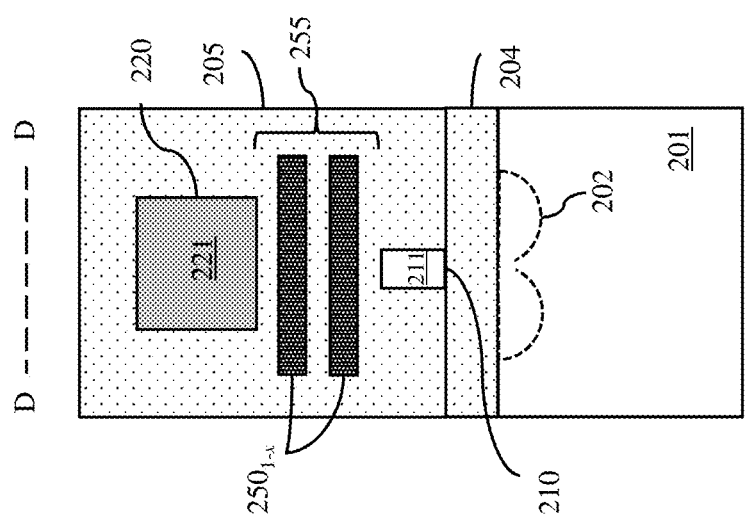
Figure 2C:
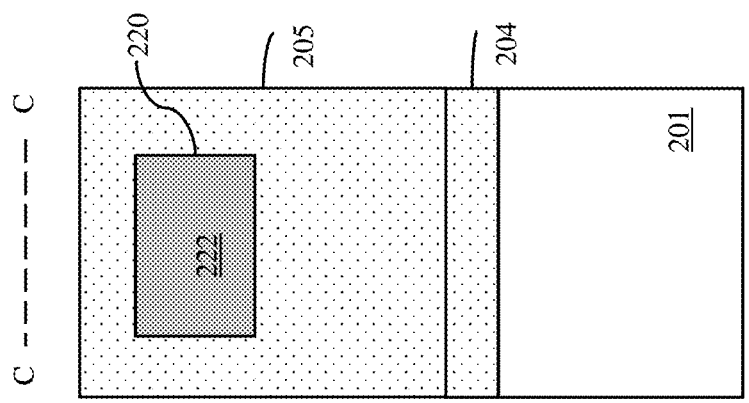
Figure 3A:
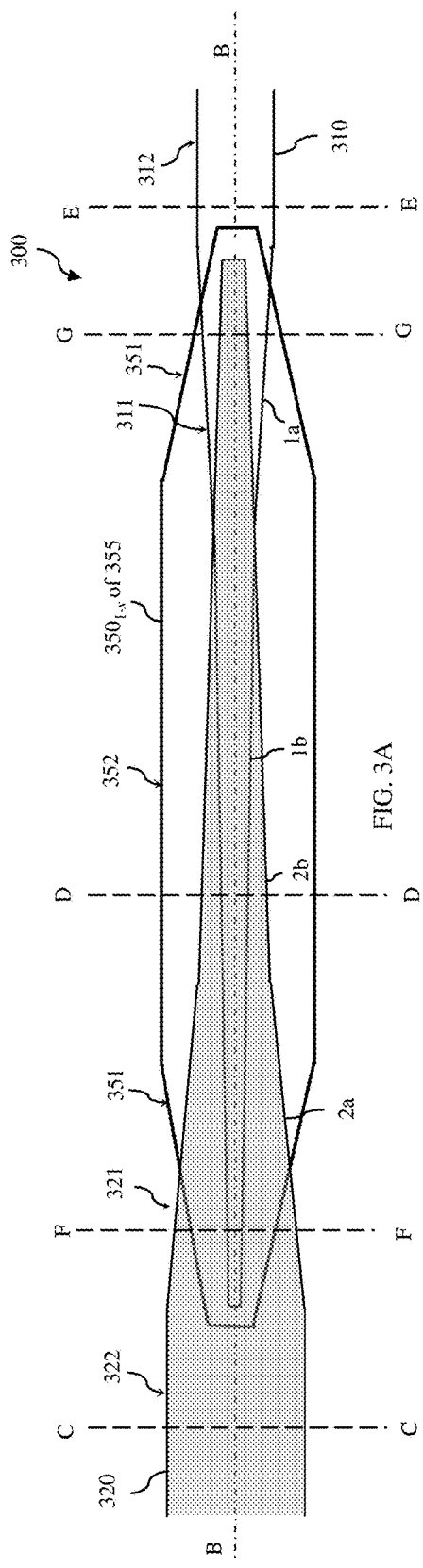
FIG. 3A is a layout diagram and FIGS. 3B-3G are different cross-section diagrams illustrating yet another embodiment of a PIC structure including a coupler for interlayer waveguide coupling.
Figure 3B:
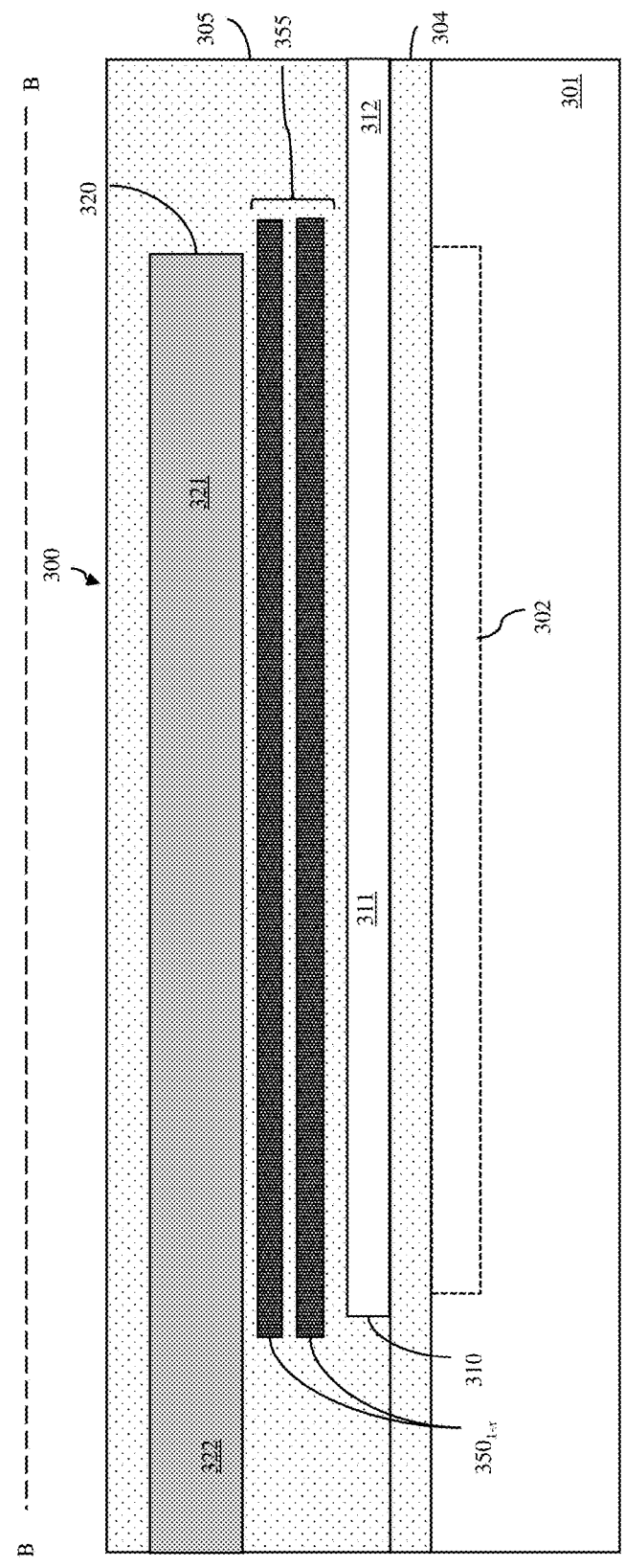
Figure 3E:
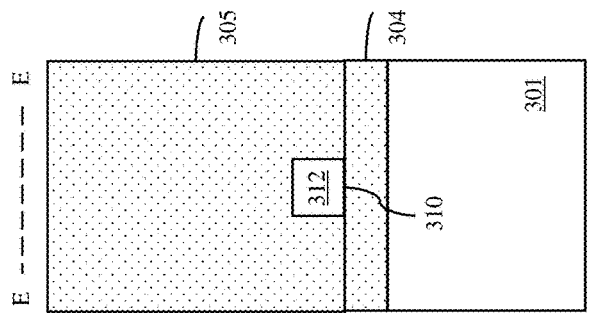
Figure 3G:
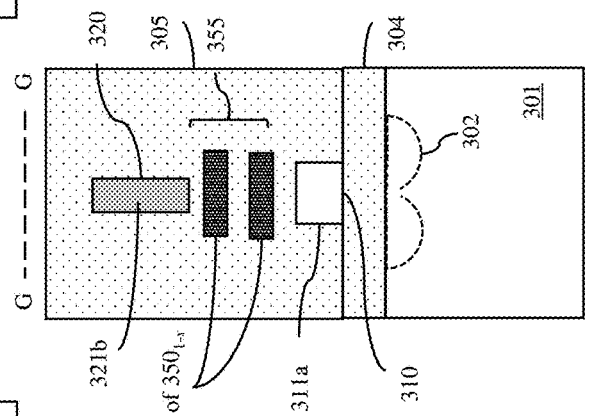
Figure 3D:
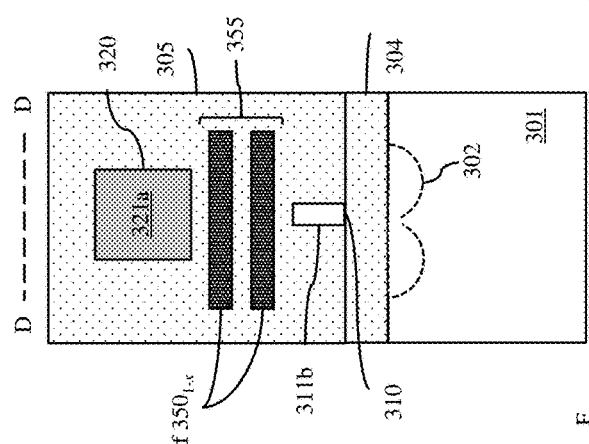
Figure 3F:
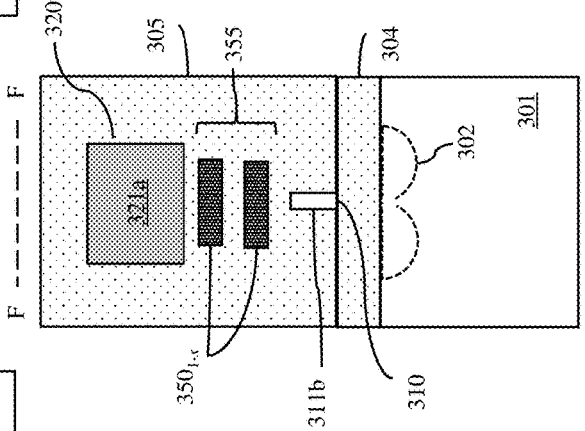
Figure 3C:
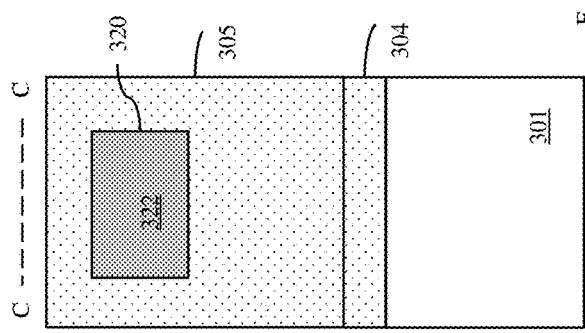
Figure 4:
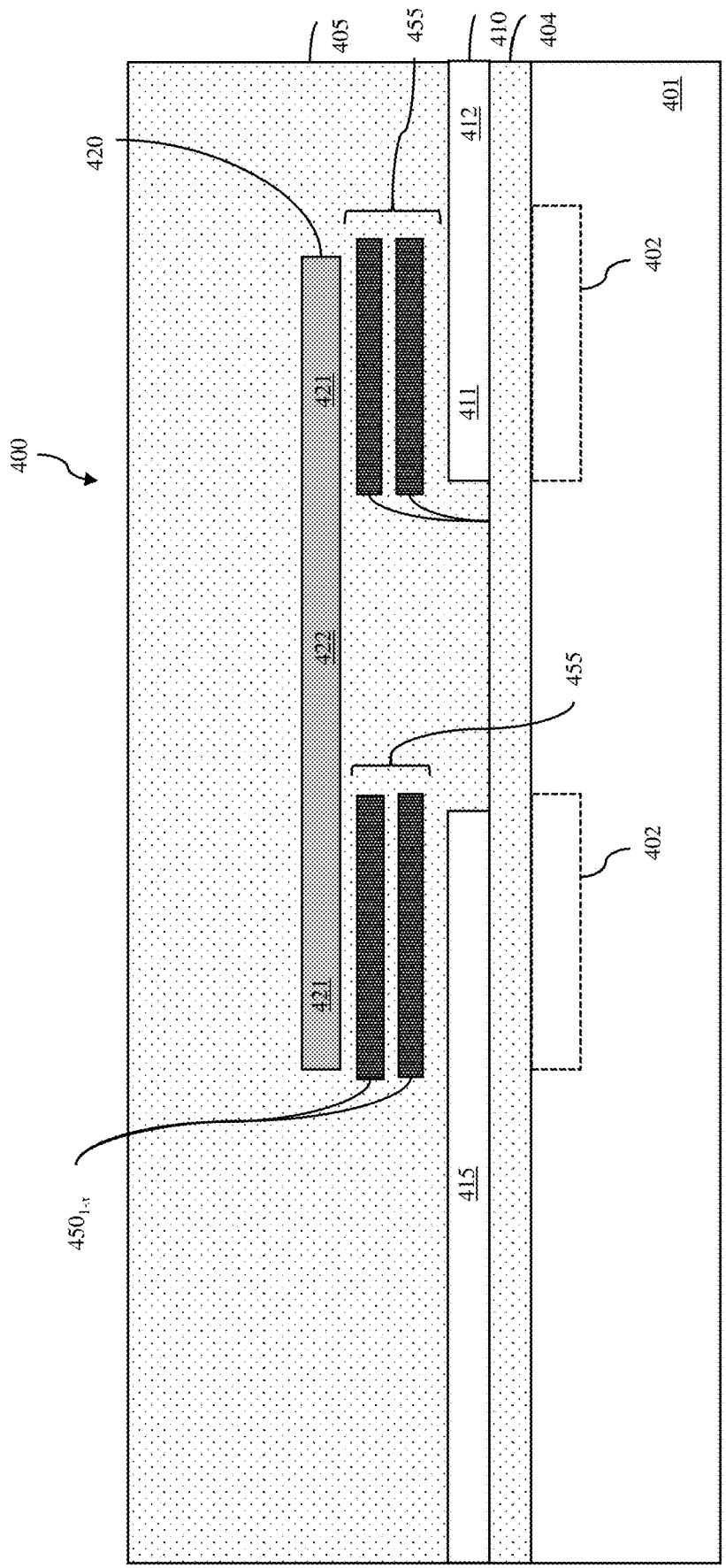
FIG. 4 is a cross-section diagram illustrating an embodiment of a PIC structure including multiple couplers for interlayer waveguide coupling.
Figure 5:
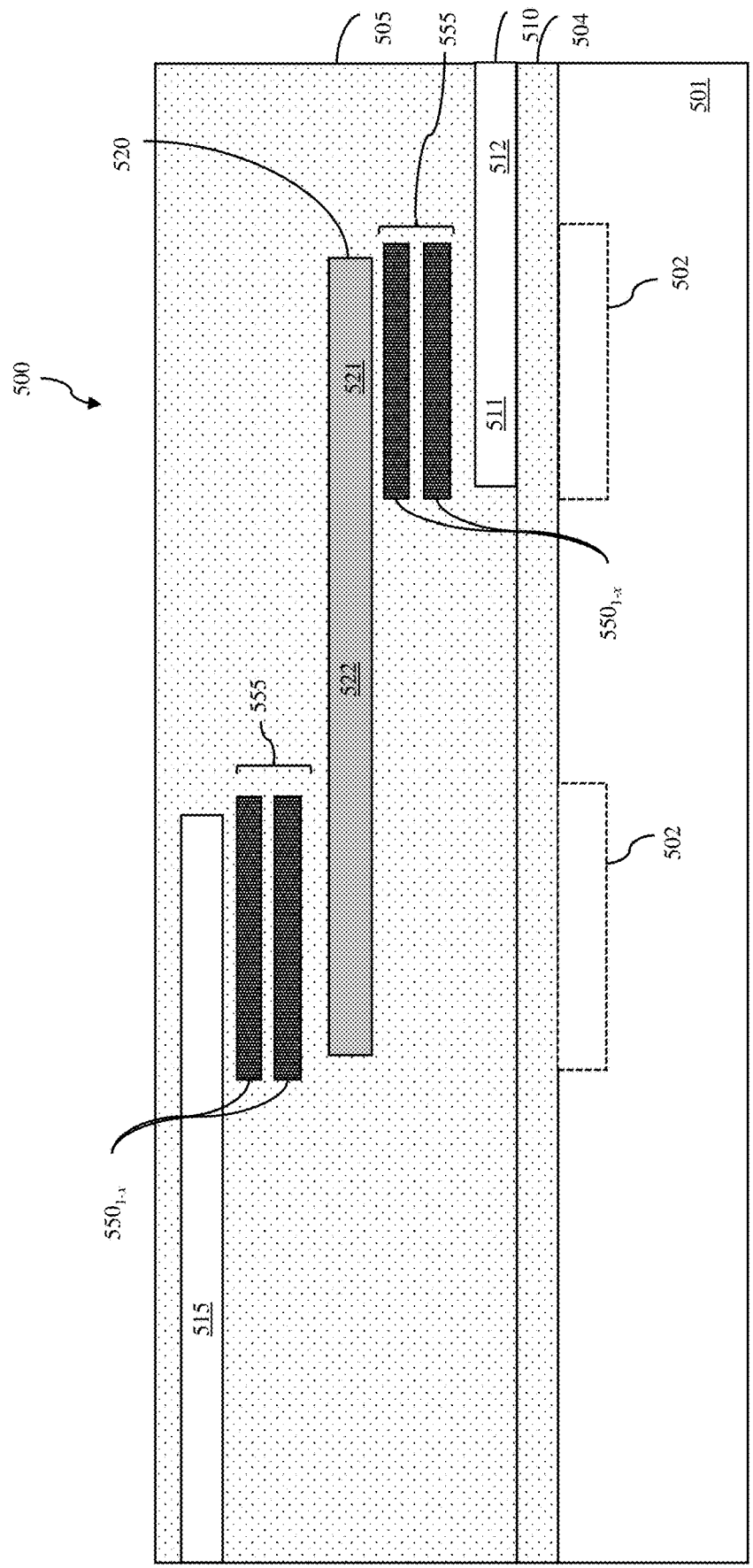
FIG. 5 is a cross-section diagram illustrating another embodiment of a PIC structure including multiple couplers for interlayer waveguide coupling.

More particularly, FIG. 1A is a layout diagram and FIGS. 1B-1E are different cross-section diagrams illustrating an embodiment of a PIC structure 100. FIG. 2A is a layout diagram and FIGS. 2B-2E are different cross-section diagrams illustrating another embodiment of a PIC structure 200. FIG. 3A is a layout diagram and FIGS. 3B-3G are different cross-section diagrams illustrating yet another embodiment of a PIC structure 300. FIG. 4 and FIG. 5 are cross-section diagrams illustrating two additional embodiments of a PIC structure 400 and 500, respectively.

Each PIC structure 100, 200, 300, 400, can include waveguides in different layers (i.e., at different levels of the structure) and further can include one or more couplers 155, 255, 355, 455, 555 to facilitate low-loss optical signal transmission between the waveguides in the different layers (i.e., to facilitate interlayer waveguide coupling).

Specifically, the PIC structure 100, 200, 300, 400, 500 can include a substrate 101, 201, 301, 401, 501. The substrate 101, 201, 301, 401, 501 can be, for example, a semiconductor substrate, such as a silicon substrate. The substrate can have a first surface and a second surface opposite the first surface. Optionally, the PIC structure can further include an insulator layer 104, 204, 304, 404, 504 on the second surface of the substrate 101, 201, 301, 401, 501. The insulator layer 104, 204, 304, 404, 504 can be, for example, a silicon dioxide layer (also referred to herein as a buried oxide (BOX) layer) or a layer of some other suitable insulator material.

The PIC structure 100, 200, 300, 400, 500 can further include at least a first waveguide and a second waveguide above the second surface of the substrate (e.g., above the insulator layer 104, 204, 304, 404, 504. The first waveguide can include a first waveguide core 110, 210, 310, 410, 510 and cladding 105, 205, 305, 405, 505 surrounding the first waveguide core 110, 210, 310, 410, 510. It should be noted that, if the first waveguide core 110, 210, 310, 410, 510 is above and immediately adjacent to the insulator layer 104, 204, 304, 404, 504, as illustrated, then that insulator layer is considered cladding for the first waveguide core (see cladding material requirements discussed in greater detail below). The second waveguide can include a second waveguide core 120, 220, 320, 420, 520 also surrounded by the cladding 105, 205, 305, 405, 505. The first waveguide core 110, 210, 310, 410, 510 and the second waveguide core 120, 220, 320, 420, 520 can be in different layers (i.e., at different levels) of the PIC structure. That is, the first waveguide core 110, 210, 310, 410, 510 can be at a first height above the second surface of the substrate and the second waveguide core 120, 220, 320, 420, 520 can be at a second height, which is greater than the first height, above the second surface of the substrate. Furthermore, the second waveguide core 120, 220, 320, 420, 520 can partially overlay the first waveguide core 110, 210, 310, 410, 510. That is, the first waveguide core 110, 210, 310, 410, 510 can have a first main body 112, 212, 312, 412, 512 and a first end portion 111, 211, 311, 411, 511. The second waveguide core 120, 220, 320, 420, 520 can have second main body 122, 222, 322, 422, 522 and a second end portion 121, 221, 321, 421, 521 that overlays the first end portion 111, 211, 311, 411, 511. That is, the first end portion and the second end portion are in the same vertical plane with the second end portion being aligned above the first end portion. However, the first main body extends away from the first end portion in a first direction and the second main body extends away from the second end portion in a second direction opposite the first direction such that the second main body does not overlay the first main body.

In order to enhance optical coupling between the two waveguides and, particularly, to ensure that some optimal maximum threshold amount for signal loss is not exceeded due to the separation distance between the first end portion 111, 211, 311, 411, 511 of the first waveguide core 110, 210, 310, 410, 510 and the second end portion 121, 221, 321, 421, 521 of the second waveguide core 120, 220, 320, 420, 520, the PIC structure 100, 200, 300, 400, 500 can further include a coupler 155, 255, 355, 455, 555 (also referred to as an enhanced coupling region) between the first end portion 111, 211, 311, 411, 511 and the second end portion 121, 221, 321, 421, 521. The coupler 155, 255, 355, 455, 555 can include one or more additional waveguides (also referred to herein as mini-waveguide) stacked between the first end portion and the second end portion. Specifically, the coupler 155, 255, 355, 455, 555 can include one or more additional waveguide cores $150_{1-x}$, $250_{1-x}$, $350_{1-x}$, $450_{1-x}$, $550_{1-x}$ stacked vertically between and physically separated from the first end portion and the second end portion and, in the case of multiple additional waveguide cores physically separated from each other. The length of the additional waveguide core(s) $150_{1-x}$, $250_{1-x}$, $350_{1-x}$, $450_{1-x}$, $550_{1-x}$, can be relatively short and, more particularly, approximately equal to the overlap distance between first end portion and the second end portion so that any overlap with the main bodies of the waveguide cores is minimal or non-existent. The additional waveguide core(s) $150_{1-x}$, $250_{1-x}$, $350_{1-x}$, $450_{1-x}$, $550_{1-x}$ can each further be surrounded by cladding 105, 205, 305, 405, 505. For purposes of illustration, two additional waveguide cores are shown in the figures. However, it should be understood the figures are not intended to be limiting. Alternatively, the coupler 155, 255, 355, 455, 555 could include a single additional waveguide core or more than two additional waveguide cores. With this coupler configuration, optical signals can pass between the end portions through each additional waveguide core (i.e., from one of the end portions of one of the waveguide cores to each additional waveguide core in sequence and then into the other end portion of the other waveguide core) without exceeding the predetermined optimal maximum threshold amount of signal loss. It should be understood the number of additional waveguide cores will vary depending upon the separation distance between the first end portion and the second end portion and maximum threshold amount of signal loss. That is, as the separation distance increases, the number of additional waveguide cores in the stack may need to be increased to limit signal loss.

Those skilled in the art will recognize that, to facilitate optical signal propagation through an optical waveguide, the waveguide core material and the waveguide cladding material adjacent thereto should have different refractive indices. Specifically, the refractive index of the waveguide cladding material should be smaller than the refractive index of the waveguide core material. During processing, the waveguides described above are formed at different processing levels, with the first waveguide being formed first, followed by the additional waveguide(s) and the second waveguide. Formation of any particular waveguide can include forming a waveguide core material layer on the partially completed structure, lithographically patterning and etching the waveguide core material layer into the desired shape for the particular waveguide core, and forming one or more cladding material layers over the particular waveguide core. Alternatively, formation of any particular waveguide can include forming a waveguide cladding material layer on the partially completed structure, lithographically patterning and etching a trench in the waveguide cladding material layer having the desired shape for the particular waveguide core, depositing a waveguide core material layer for the particular waveguide core, performing a chemical mechanical polishing (CMP) process to remove any waveguide core material from the top surface of the waveguide cladding material layer, and forming one or more additional cladding material layers over the particular waveguide core and on the cladding material layer.

Given such processing techniques, in the disclosed embodiments the first waveguide core 110, 210, 310, 410, 510, the second waveguide core 120, 220, 320, 420, 520, and each additional waveguide core $150_{1-x}$, $250_{1-x}$, $350_{1-x}$, $450_{1-x}$, $550_{1-x}$ can be made of the same waveguide core material. Alternatively, any one or more of these waveguide cores can be made of different waveguide core materials. For example, the first waveguide core 110, 210, 310, 410, 510 and the second waveguide core 120, 220, 320, 420, 520 can be made of the same or different waveguide core materials. Additionally, the additional waveguide core(s) $150_{1-x}$, $250_{1-x}$, $350_{1-x}$, $450_{1-x}$, $550_{1-x}$ can be made of a different waveguide core material than one or both of the first and second waveguide cores. In the case of multiple additional waveguide cores, they can also be made of the same or different waveguide core materials. Furthermore, the cladding 105, 205, 305, 405, 505 surrounding all of the waveguide cores (including, if applicable, the insulator layer 104, 204, 304, 404, 504) can be made up of layers of all the same cladding material or layers of two or more different cladding materials from below the first waveguide core 110, 210, 310, 410, 510 to above the second waveguide core 120, 220, 320, 420, 520 (as long as the layers of cladding material adjacent to any particular waveguide core have a smaller refractive index than that waveguide core).

For example, in some embodiments, the first waveguide core 110, 210, 310, 410, 510 could be a silicon waveguide core (e.g., with a refractive index of 3 or larger), a silicon nitride waveguide core (e.g., an Si3N4 waveguide core with a refractive index of 2.0), or a waveguide core of any other suitable waveguide core material (e.g., polysilicon, silicon germanium, polysilicon germanium, etc.). The second waveguide core 120, 220, 320, 420, 520 could be a silicon nitride waveguide core (e.g., an Si3N4 waveguide core with a refractive index of 2.0) or a waveguide core of any other suitable waveguide core material. Each additional waveguide core $150_{1-x}$, $250_{1-x}$, $350_{1-x}$, $450_{1-x}$, $550_{1-x}$ can be made of a suitable material having a relatively high refractive index. Such materials include, but not limited to, silicon carbon nitride (SiCN), silicon oxynitride (SiON), silicon nitride (SiN), aluminum nitride (A1N), gallium nitride (GaN), or alumina (A12O3). Optionally, the list of suitable waveguide core materials for the additional waveguide core(s) could extend to III-V semiconductors and polymers.

The following is a list of exemplary cladding materials (and refractive index (n) thereof) that could be employed for the layers of cladding 105, 205, 305, 405, 505, depending the refractive indices of the adjacent waveguide cores:

(1) HfO2 (Hafnium dioxide), n=2.0754@1.31 um, n=2.0709@1.55 um;
(2) ZrO2 (Zirconium dioxide, Zirconia), n=2.1155@1.31 um, n=2.1103@1.55 um;
(3) Si3N4, n=~2;
(4) SiON, n=~1.46 to ~2.1;
(5) AN (Aluminum nitride), n=~2.1 to —2.4;
(6) TiO2 (Titanium dioxide), n=2.4622@1.31 um, n=2.4538@1.55 um;
(7) ZnO (Zinc monoxide), n=1.9318@1.31 um, n=1.9267@1.55 um;
(8) Al2O3 (Aluminum oxide), n=1.7503@1.31 um, n =1.7462 @1.55 um;
(9) MgO (Magnesium oxide), n=1.7178@1.31 um, n =1.7146 @1.55 um;
(10) SiO2 (Silicon dioxide), n<1.6, n=1.45@1.31 um;
(11) CaF2 (Calcium fluoride), n=1.4272 @1.31 um, n=1.4260 @1.55 um;
(12) OMCTS (SiCOH) n=1.406@1.31 um; and
(13) MgF2 (Magnesium fluoride), n=1.3718@1.31 um, n=1.3705@1.55 um.

As mentioned above, for optical signals to pass between two waveguides (i.e., from one waveguide core to another waveguide core) adjacent portions of the two waveguide cores must be sufficiently close and there must be mode matching at a location along the adjacent portions of the waveguide cores (i.e., there must at least one location where the propagation constant of optical mode inside the two adjacent portions is the same). Those skilled in the art will recognize that the optical mode of light is generally determined by refractive index profile of the waveguide core and its cross-sectional geometric size and shape. If the waveguide cores have the same refractive index profiles, mode matching generally occurs at a location where the cross-sectional areas of the adjacent portions of the waveguide cores are approximately the same. If the waveguide cores are made of different core materials with different refractive index profiles, mode matching can occur at a location where the adjacent portions of the waveguide cores have different cross-sectional areas but the same propagation constant which is determined by the respective combinations of refractive index and cross-sectional area.

Thus, optionally, the shapes of the waveguide cores and, particularly, of the first end portion 111, 211, 311, 411, 511 of the first waveguide core 110, 210, 310, 410, 510, of the second end portion 121, 221, 321, 421, 521 of the second waveguide core 120, 220, 320, 420, 520 and of the additional waveguide core(s) $150_{1-x}$, $250_{1-x}$, $350_{1-x}$, $450_{1-x}$, $550_{1-x}$ can be configured so as to maximize the chance of mode matching between the first end portion 111, 211, 311, 411, 511 and the adjacent additional waveguide core (e.g., the lowest additional waveguide core in the case of multiple additional waveguide cores), between each additional waveguide core (e.g., in the case of multiple additional waveguide cores), and between the second end portion 121, 221, 321, 421, 521 and the adjacent additional waveguide core (e.g., the highest additional waveguide core in the case of multiple additional waveguide cores) particularly when two or more of the waveguide cores are made of different waveguide core materials and/or when two or more of the waveguide cores have main bodies with different cross-sectional areas.

For example, in some of the disclosed embodiments (e.g., see the PIC structure 100 of FIGS. 1A-1E, 200 of FIGS. 2A-2E, and 300 of FIGS. 3A-3G), the first end portion 111, 211, 311 of the first waveguide core 110, 210, 310 and/or the second end portion 121, 221, 321 of the second waveguide core 120, 220, 320 can be tapered. For example, the width of the first end portion 111, 211, 311 can taper down (i.e., decrease) from a first maximum width adjacent to the first main body 112, 212, 312 to a first minimum width at an end wall farthest from the first main body (i.e., close to the second main body of the second waveguide core), as illustrated. The width of the first end portion can taper down (i.e., decrease) essentially linearly (e.g., as illustrated in the PIC structure 100 of FIGS. 1A-1E and as illustrated in the PIC structure 200 of FIGS. 2A-2E), in multiple stages with different taper angles (e.g., see stages 1a and 1b of the first end portion 311, as illustrated in the PIC structure 300 of FIGS. 3A-3G), exponentially, etc. Additionally or alternatively, the width of the second end portion 121, 221, 321 can taper down (i.e., decrease) from a second maximum width adjacent to the second main body 122, 222, 322 to a second minimum width at an end wall farthest from the second main body (i.e., close to the first main body of the first waveguide core), as illustrated. The width of the second end portion can taper down (i.e., decrease) essentially linearly (e.g., as illustrated in the PIC structure 100 of FIGS. 1A-1E, as illustrated in the PIC structure 200 of FIGS. 2A-2E), in multiple stages with different taper angles (e.g., see stages 2a and 2b of the second end portion 321, as illustrated in the PIC structure 300 of FIGS. 3A-3G), exponentially, etc. It should be noted that in embodiments where an end portion of a waveguide core has multiple stages with different taper angles the transition between the stages can be smooth (i.e., the minimum width of one stage can be essentially equal to the maximum width of the adjacent stage), as illustrated in FIG. 3A. Alternatively, the transition between the stages could be stepped (e.g., the minimum width of one stage could be less than or greater than the maximum width of the adjacent stage). Furthermore, while FIGS. 1A-1E and 2A-2E show both the first end portion 111, 211 and the second end portion 121, 221 having a single taper angle and FIGS. 3A-3G show both the first end portion 311 and the second end portion 321 having multiple stages with different tapered angles, it should be understood that these figures are not intended to be limiting. For example, optionally, one end portion of one waveguide core (e.g., either the first or second end portion) could have a single taper angle and the other end portion of the other waveguide core could have multiple stages with different taper angles.

In some of the disclosed embodiments (e.g., see the PIC structure 100 of FIGS. 1A-1E), each additional waveguide core 150$_{1-x}$ can be essentially rectangular in shape (i.e., with a uniform width). If the coupler 155 includes multiple additional waveguide cores 150$_{1-x}$, those additional waveguide cores should be essential the same size (e.g., with the same cross-sectional area), as illustrated, and made of the same waveguide core material to achieve mode matching between them. Alternatively, the additional waveguide cores could be made of different waveguide core materials and have different sizes (e.g., different cross-sectional areas) to achieve mode matching between them.

In other disclosed embodiments (e.g., see the PIC structure 200 of FIGS. 2A-2E and 300 of FIGS. 3A-3G), each additional waveguide core 150$_{1-x}$ can have an essentially rectangular-shaped main body 252, 352 with a uniform width and opposing ends 251-351 that are tapered. If the coupler 255, 355 includes multiple additional waveguide cores 250$_{1-x}$, 350$_{1-x}$, those additional waveguide cores can be essential the same size, as illustrated, and made of the same waveguide core material to achieve mode matching between them. Alternatively, the additional waveguide cores could be made of different waveguide core materials and have different sizes to achieve mode matching between them.

It should be understood that, although not specifically illustrated in the drawings, the first end portion 411, 511 of the first waveguide core 410, 510 and the second end portion 421, 521 of the second waveguide core 420, 520 can similarly be tapered (e.g., linearly, in multiple stages, exponentially, etc.). Furthermore, although not specifically illustrated in the drawings, the additional waveguide core(s) 450$_{1-x}$, 550$_{1-x}$ can be essentially rectangular in shape (e.g., similar to the structure shown in FIG. 1A) or, alternatively, can have a main portion that is rectangular in shape and opposing ends that are tapered (e.g., similar to the structure shown in FIG. 2A or 3A).

In any case, tapering of the first end portion 111, 211, 311, 411, 511, tapering of the second end portion 121, 221, 321, 421, 521, and optional tapering of the opposing ends of the additional waveguide core(s) can be employed to ensure that mode matching occurs from waveguide core to waveguide core. That is, such tapering can be employed: (a) to ensure that at some location, along the overlap between the first end portion and the additional waveguide core above, mode matching occurs (i.e., the propagation constant of optical mode inside the first end portion and inside the additional waveguide core above becomes the same); (b) to ensure that at some location, along the overlap between any adjacent pair of additional waveguide cores, mode matching occurs (i.e., the propagation constant of the adjacent pair of additional waveguide cores becomes the same); and (c) to ensure that at some location, along the overlap between the second end portion and the additional waveguide core below, mode matching occurs (i.e., the propagation constant of optical mode inside the second end portion and the additional waveguide core below becomes the same).

Thus, for example, depending upon the different waveguide core materials used for the first waveguide core, the second waveguide core and the additional waveguide core(s) of the coupler(s), the first maximum width of the first end portion of the first waveguide core, the second maximum width of the second end portion of the second waveguide core, and/or an additional maximum width of the opposing end portions of the additional waveguide core(s) can be different. For example, the additional maximum width of the opposing end portions of the additional waveguide core(s) can be greater than the first maximum width of the first end portion of the first waveguide core and greater than the second maximum width of the second end portion of the second waveguide core. Furthermore, the second maximum width of the second end portion of the second waveguide core can be greater than the first maximum width of the first end portion of the first waveguide core. The various differences between the dimensions of the waveguide cores can be predetermined to achieve mode matching.

With regard to the PIC structure 400 of FIGS. 4 and 500 of FIG. 5, although not specifically illustrated in the drawings, the first end portion 411, 511 of the first waveguide core 410, 510 and the second end portion 421, 521 of the second waveguide core 420, 520 can similarly be tapered (e.g., linearly, in multiple stages, exponentially, etc.). Furthermore, although not specifically illustrated in the drawings, the additional waveguide core(s) 450$_{1-x}$, 550$_{1-x}$ can be essentially rectangular in shape (e.g., similar to the structure shown in FIG. 1A) or, alternatively, can have a main portion that is rectangular in shape and opposing ends that are tapered (e.g., similar to the structure shown in FIG. 2A or 3A).

Additionally, it should be noted that the PIC structure 400 of FIG. 4 and the PIC structure 500 of FIG. 5 further illustrate that the second waveguide core 420, 520 can have opposing second end portions 421, 521 and couplers 455, 555 can be employed at both of the second end portions to couple the second waveguide core 420, 520 to both the first waveguide core 410, 510 and another waveguide core 415, 515.

For example, as illustrated in the PIC structure 400 of FIG. 4, couplers 455 can be aligned below both end portions 421 of the second waveguide core 420 so as to optically couple the second waveguide to two different waveguides (i.e., the first waveguide with the first waveguide core 410 and another waveguide with another waveguide core 415) both at some level below the second waveguide core 420. For purposes of illustration, the waveguide cores 410 and 415 are shown as being at the same level. That is, the first waveguide core 410 and the other waveguide core 415 are at the same first height above the second surface of the substrate and, thus, separated from the second waveguide core 420 by the same separation distance such that the two couplers 455 have the same number of additional waveguide cores 450$_{1-x}$. However, it should be understood that the waveguide cores 410 and 415 could be at different levels. That is, the first waveguide core 410 and the other waveguide core 415 could be at different heights above the second surface of the substrate and, thus, separated from the second waveguide core 420 by different separation distances such that the two couplers 455 require different numbers of additional waveguide cores 450$_{1-x}$.

As illustrated in the PIC structure 500 of FIG. 5, couplers 555 can be adjacent both end portions 521 of the second waveguide core 520 (e.g., one above and one below, as illustrated) so as to optically couple the second waveguide to two different waveguides (i.e., the first waveguide with the first waveguide core 510 and another waveguide with another waveguide core 515). For purposes of illustration, the waveguide cores 510 and 515 are shown as being separated from the second waveguide core 520 by the same separation distance such that the two couplers 555 have the same number of additional waveguide cores 550$_{1-x}$. However, it should be understood that the waveguide cores 510 and 515 could be separated from the second waveguide core 520 by different separation distances such that the two couplers 555 require different numbers of additional waveguide cores 550$_{1-x}$.

Optionally, the PIC structure 100, 200, 300, 400, 500 can further include a cavity 102, 202, 302, 402, 502 within the substrate 101, 201, 301, 401, 501 adjacent to the second surface (e.g., adjacent to the insulator layer 104, 204, 304, 404, 504). This cavity 102, 202, 302, 402, 502 can be filled with air, with gas, or under vacuum. Furthermore, this cavity 102, 202, 302, 402, 502 can be aligned below the first end portion 111, 211, 311, 411, 511 of the first waveguide core 110, 210, 310, 410, 510 and, thereby aligned below both the coupler 155, 255, 355, 455, 555 and the second end portion 121, 221, 321, 421, 521 of the second waveguide core 120, 220, 320, 420, 520. Such a cavity 102, 202, 302, 402, 502 can be employed to minimize leakage loss through the substrate 101, 201, 301, 401, 501. Various techniques for forming such a localized cavity are well known in the art and, thus, the details have been omitted from this specification in order to allow the reader to focus on the salient aspects of the disclosed embodiments. However, typically such a cavity is formed by etching relatively small holes through an isolation region, through the insulator layer below the isolation region, and into the substrate on opposite sides of the desired location for the cavity, preforming a selective isotropic etch process through holes to form cavities that eventually merge below the desired location, and plugging the holes with an isolation material (e.g., silicon dioxide).

Figure 6A:
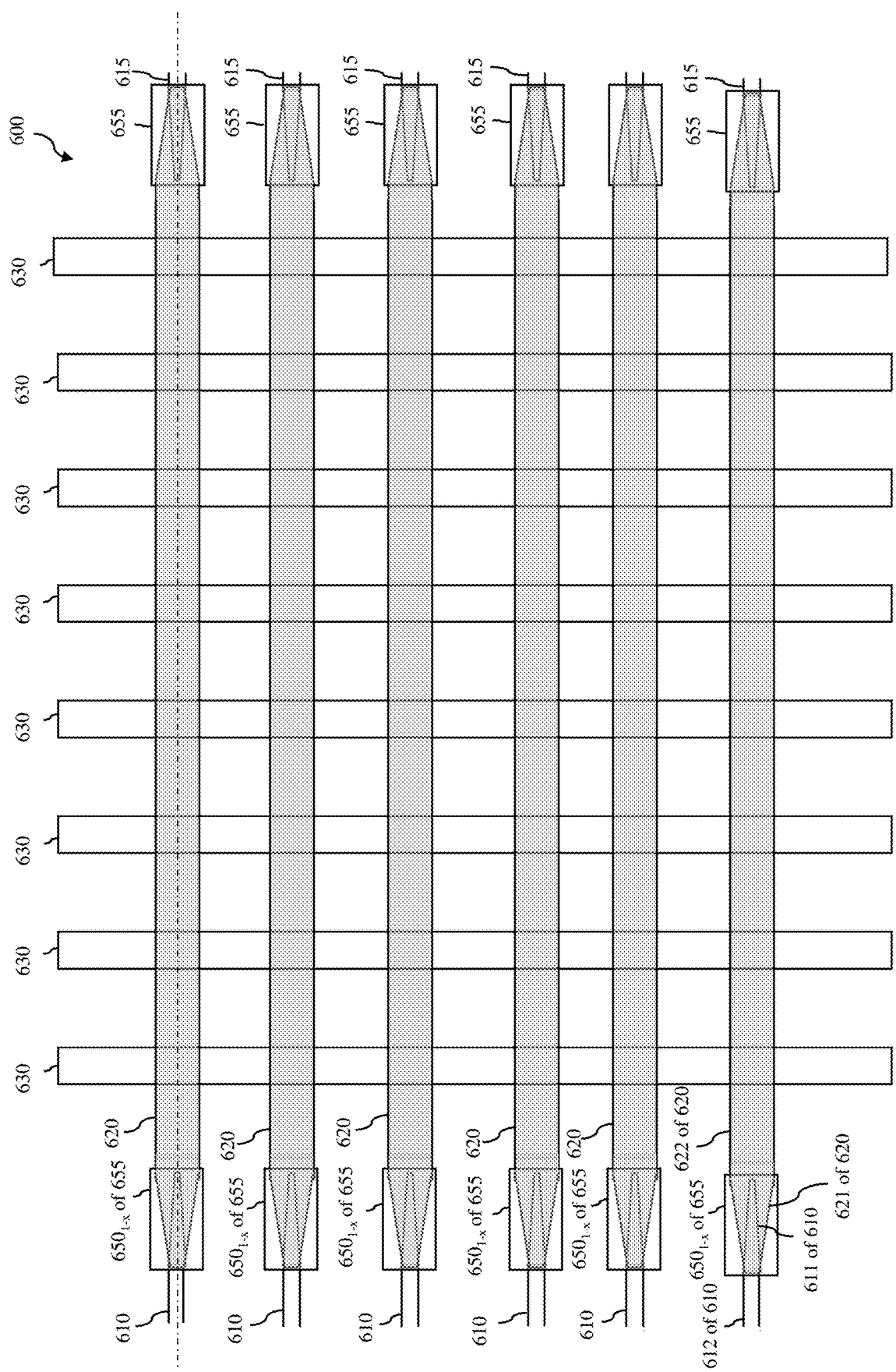
FIG. 6A is a layout diagram and FIG. 6B is a cross-section diagram illustrating an embodiment of a system including a crossing array implemented using couplers configured for interlayer waveguide coupling.
Figure 6B:
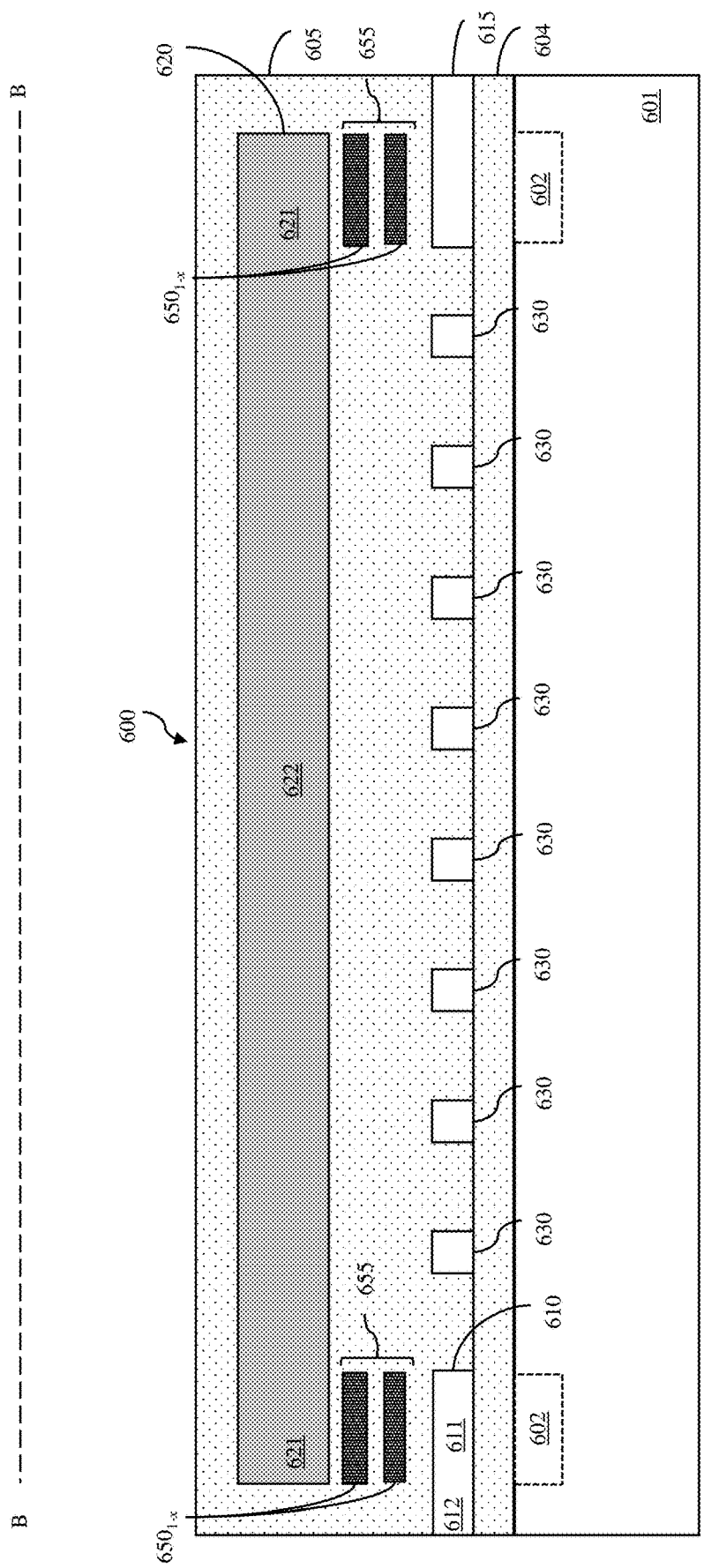

FIG. 6A is a layout diagram and FIG. 6B is a cross-section diagram illustrating yet another embodiment of a PIC structure 600. In this case, the PIC structure 600 includes an on-chip system (e.g., a photonic computing system) that includes a crossing array implemented using the above-described couplers. The PIC structure 600 includes a semiconductor substrate 601 with a first surface and a second surface opposite the first surface. The PIC structure can further include an insulator layer 604 on the second surface of the semiconductor substrate 601.

The PIC structure 600 can further include a group of first waveguide cores 610 at a first height above the substrate (e.g., optionally, above and immediately adjacent to the insulator layer). In this group, each first waveguide cores 610 can have a first main body 612 and a first end portion 611. The PIC structure 600 can further include a group of second waveguide cores 620 at some level above the first waveguide cores 610. That is, the second waveguide cores 620 can be at a second height, which is greater than the first height, above the substrate 601. In this group, the second waveguide cores 620 can be parallel. Each second waveguide core 620 can have a second main body 622 and, at opposite ends, a second end portion 621. At least at one end, the second end portions 621 of the second waveguide cores 620 overlay and are physically separated from the corresponding first end portions 611 of the first waveguide cores 610. The structure can further include a group of third waveguide cores 630. The group of second waveguide cores 620 can overlay the group of third waveguide cores 630 such that the third waveguide cores 630 are oriented essentially perpendicular to the second waveguide cores 620 (e.g., in a crossing array arrangement). For purposes of illustration, the third waveguide cores 630 are shown as being at the same level as the first waveguide cores 610 (i.e., at the same height above the substrate and, thus, separated from the second waveguide cores 620 by the same separation distance). However, it should be understood that, alternatively, the third waveguide cores 630 could be at a third height above the substrate that is different from (e.g., greater or less than) the first height of the first waveguide cores 610 and, thus, separated from the second waveguide cores 620 by a separation distance that is different from the separation distance separating the first and second waveguide cores. In any case, the third waveguide cores 630 should be below the second waveguide cores 620 and separated therefrom by a sufficient separation distance to avoid optical coupling (i.e., to prevent optical signal transmission between the second waveguide cores 620 and the third waveguide cores 630).

The PIC structure 600 can further include a group of couplers 655 for coupling the first end portions 611 of the first waveguide cores 610 to the overlying second end portions 621 of the second waveguide cores 620 above. Each coupler 655 can include one or more additional waveguide cores $650_{1-x}$ stacked vertically between and physically separated from a first end portion 611 of a first waveguide core 610 and a second end portion 621 of a second waveguide core 620. It should be noted that the configuration of the couplers 655 can be essentially the same as any of the couplers 155, 255, 355 described above and illustrated in FIGS. 1A-1E, 2A-2E or 3A-3G, respectively. However, for purposes of illustration, the couplers 655 are shown in the figures as being configured essentially the same as the coupler 155 of FIGS. 1A-1E.

In any case, all of the waveguide cores discussed above (i.e., the first waveguide cores 610, the second waveguide cores 620, the third waveguide cores 630 and the additional waveguide core(s) $650_{1-x}$ of the couplers 655) can be surrounded by cladding 605 (including the insulator layer 604 if the first waveguide cores 610 are above and immediately adjacent thereto).

Optionally, in the PIC structure 600, the second waveguide core 620 of the PIC structure can have opposing second end portions 621 and couplers 655 can be employed at both of the second end portions to couple the second waveguide cores 620 to both the first waveguide cores 610 and other waveguide cores 615. The waveguide cores 615 can be, for example, at some level below the second waveguide cores 620, such as at the same level as the first waveguide cores 610, as illustrated and similar to the structure shown in FIG. 4 and described above. However, it should be understood that the figures are not intended to be limiting. Alternatively, the waveguide cores 615 could be below the level of the second waveguide cores 620, but at a different level than the first waveguide such that the couplers on either side of the structure require different numbers of additional waveguide core(s) $650_{1-x}$. Alternatively, the waveguide cores 615 could be above the level of the second waveguide cores 620, similar to the structure shown in FIG. 5 and described above.

Optionally, any of the above-described PIC structures 100, 200, 300, 400, 500, 600 can further include at least one cavity 102, 202, 302, 402, 502, 602 within the substrate 101, 201, 301, 401, 501, 601 adjacent to the second surface (e.g., adjacent to the insulator layer 104, 204, 304, 404, 504, 604) and aligned below a corresponding coupling region. For example, a cavity 102, 202, 302, 402, 502, 602 can be aligned below a first end portion 111, 211, 311, 411, 511, 611 of a first waveguide core 110, 210, 310, 410, 510, 610 and, thereby aligned below both the coupler 155, 255, 355, 455, 555, 655 and the second end portion 121, 221, 321, 421, 521 of the second waveguide core 120, 220, 320, 420, 520, 620 above that first end portion. The cavity 102, 202, 302, 402, 502, 602 can be filled with air, with gas, or under vacuum and can be employed to minimize leakage loss from that coupling region through the substrate 101, 201, 301, 401, 501, 601. Various techniques for forming such a localized cavity are well known in the art and, thus, the details have been omitted from this specification in order to allow the reader to focus on the salient aspects of the disclosed embodiments. However, typically such a cavity is formed by etching relatively small holes through an isolation region, through the insulator layer below the isolation region, and into the substrate on opposite sides of the desired location for the cavity, preforming a selective isotropic etch process through holes to form cavities that eventually merge below the desired location, and plugging the holes with an isolation material (e.g., silicon dioxide).

As mentioned above, the coupler(s) 155, 255, 355, 455, 555, 655 in the PIC structure 100, 200, 300, 400, 500 facilitate interlayer waveguide coupling when the separation distance between adjacent overlapping end portions of the waveguide cores is too great to allow optical signals to pass therebetween without exceeding some optimal maximum threshold amount of signal loss. This low-loss signal transmission applies to optical signals in all modes (e.g., in the transverse electric (TE), transverse magnetic (TM) and transverse electromagnetic (TEM) modes). Furthermore, by employing such couplers that allow for interlayer waveguide coupling, the overall footprint of a PIC can be scaled in size.

It should be understood that in the embodiments described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should further be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core with a first end portion;
   a second waveguide core with a second end portion overlaying and physically separated from the first end portion; and
   a coupler between the first end portion and the second end portion, wherein the coupler comprises multiple additional waveguide cores stacked vertically between and physically separated from the first end portion and the second end portion,
   wherein the first end portion and the second end portion are tapered in opposite directions,
   wherein each of the additional waveguide cores has a section between opposing ends that is wider than adjacent sections of the first end portion below and the second end portion above, and
   wherein the additional waveguide cores have a same area dimension.

2. The structure of claim 1, wherein the additional waveguide cores are center-aligned with the first end portion and the second end portion.

3. The structure of claim 1, wherein the first end portion is tapered in a first direction down to a minimum first width at a first endwall and the second end portion is tapered in a second direction opposite the first direction down to a minimum second width at a second endwall and wherein the additional waveguide cores extends laterally beyond the first endwall and the second endwall.

4. The structure of claim 1, wherein at least one of the first end portion and the second end portion is tapered in multiple stages with different taper angles.

5. The structure of claim 1, wherein the additional waveguide cores are rectangular in shape.

6. The structure of claim 1, wherein the additional waveguide cores have tapered opposing ends.

7. The structure of claim 1, wherein the first end portion has a first maximum width, wherein the second end portion has a second maximum width, and wherein the section of each of the additional waveguide cores between the opposing ends has an additional maximum width that is greater than the first maximum width and the second maximum width.

8. The structure of claim 7, wherein the first maximum width is less than the second maximum width.

9. The structure of claim 1, wherein the first waveguide core, the second waveguide core and the additional waveguide cores comprise a same waveguide core material.

10. The structure of claim 1, wherein the additional waveguide cores comprises a different waveguide core material than at least the first waveguide core.

11. The structure of claim 10, wherein the first waveguide core and the second waveguide core comprise different waveguide core materials.

12. The structure of claim 10, wherein the first waveguide core and the second waveguide core comprise a same waveguide core material.

13. The structure of claim 1,
    wherein the first waveguide core comprises any of silicon and silicon nitride,
    wherein the second waveguide core comprises silicon nitride, and
    wherein the additional waveguide cores comprises any of silicon carbon nitride, silicon oxynitride, silicon nitride., silicon nitride, aluminum nitride, gallium nitride, and alumina.

14. The structure of claim 1, wherein the first waveguide core, the second waveguide core, and the additional waveguide cores are surrounded by cladding.

15. A structure comprising:
    a semiconductor substrate having a first surface, a second surface opposite the first surface, and a cavity adjacent to the second surface;
    an insulator layer immediately adjacent to the second surface of the semiconductor substrate and extending over the cavity;
    a first waveguide core immediately adjacent to the insulator layer and having a first end portion aligned above the cavity, wherein the first waveguide core is a silicon waveguide core;
    a second waveguide core with a second end portion overlaying and physically separated from the first end portion; and
    a coupler between the first end portion and the second end portion, wherein the coupler comprises additional waveguide cores stacked vertically between and physically separated from the first end portion and the second end portion,
    wherein the first end portion and the second end portion are tapered in opposite directions,
    wherein each of the additional waveguide cores has a section between opposing ends that is wider than adjacent sections of the first end portion below and the second end portion above, and wherein the additional waveguide cores have a same area dimension.

16. The structure of claim 15, wherein the additional waveguide cores are center-aligned with the first end portion and the second end portion.

17. The structure of claim 15, wherein the first end portion is tapered in a first direction down to a minimum first width at a first endwall and the second end portion is tapered in a second direction opposite the first direction down to a minimum second width at a second endwall and wherein the additional waveguide cores extends laterally beyond the first endwall and the second endwall.

18. The structure of claim 15, wherein the additional waveguide cores are rectangular in shape.

19. The structure of claim 15, wherein the additional waveguide cores have tapered opposing ends.

20. A structure comprising:
a group of first waveguide cores, wherein the first waveguide cores have first end portions;
a group of second waveguide cores, wherein the second waveguide cores are parallel and have second end portions overlaying and physically separated from the first end portions, respectively;
a group of third waveguide cores, wherein the group of second waveguide cores overlays the group of third waveguide cores and wherein the third waveguide cores are perpendicular to the second waveguide cores; and
a group of couplers, wherein each coupler comprises at least one additional waveguide core stacked vertically between and physically separated from a first end portion of a first waveguide core and a second end portion of a second waveguide core.

* * * * *